United States Patent
He et al.

(10) Patent No.: US 12,278,520 B2
(45) Date of Patent: Apr. 15, 2025

(54) STATOR AND MOTOR

(71) Applicants: Guangdong Midea White Home Appliance Technology Innovation Center Co., Ltd., Foshan (CN); Midea Group Co., Ltd., Foshan (CN)

(72) Inventors: Tianran He, Foshan (CN); Ziqiang Zhu, Foshan (CN); Hong Bin, Foshan (CN); Liming Gong, Foshan (CN)

(73) Assignees: GUANGDONG MIDEA WHITE HOME APPLIANCE TECHNOLOGY INNOVATION CENTER CO., LTD, Foshan (CN); MIDEA GROUP CO., LTD., Foshan (CN)

(*) Notice: Subject to any disclaimer, the term of this patent is extended or adjusted under 35 U.S.C. 154(b) by 380 days.

(21) Appl. No.: 17/679,028

(22) Filed: Feb. 23, 2022

(65) Prior Publication Data

US 2022/0181922 A1 Jun. 9, 2022

Related U.S. Application Data

(63) Continuation of application No. PCT/CN2020/137744, filed on Dec. 18, 2020.

(30) Foreign Application Priority Data

Dec. 31, 2019 (CN) .......................... 201911422872.6
Dec. 31, 2019 (CN) .......................... 201922499845.0
(Continued)

(51) Int. Cl.
*H02K 1/14* (2006.01)
*H02K 1/16* (2006.01)
(Continued)

(52) U.S. Cl.
CPC ............... *H02K 1/148* (2013.01); *H02K 1/16* (2013.01); *H02K 1/20* (2013.01); *H02K 3/28* (2013.01)

(58) Field of Classification Search
CPC ............ H02K 1/148; H02K 1/16; H02K 1/20; H02K 3/28
See application file for complete search history.

(56) References Cited

U.S. PATENT DOCUMENTS

| 3,191,239 A | 6/1965 | Moore et al. |
| 8,203,246 B2 | 6/2012 | Nasjiki et al. |

(Continued)

FOREIGN PATENT DOCUMENTS

| CN | 103078423 A | 5/2013 |
| CN | 103078462 A | 5/2013 |

(Continued)

OTHER PUBLICATIONS

JP H1198786 A Machine Translation (Year: 1999).*

(Continued)

*Primary Examiner* — Quyen P Leung
*Assistant Examiner* — Masoud Vaziri
(74) *Attorney, Agent, or Firm* — Morgan, Lewis & Bockius LLP (57) ABSTRACT

A stator includes a stator core having a plurality of inner stator teeth and a ring-shaped stator yoke. The plurality of inner stator teeth is arranged on an inner side of the stator yoke at intervals along a circumferential direction of the stator yoke, and extends to a central axis of the stator yoke, so that stator slots are formed between adjacent inner stator teeth; and a first phase winding, a second phase winding, and a third phase winding wound around two adjacent inner stator teeth. Each of the stator slots is divided into an inner space and an outer space along a radial direction of the stator (Continued)

yoke; each of the first phase winding, the second phase winding, and the third phase winding penetrates through inner spaces or outer spaces of the corresponding two stator slots.

11 Claims, 8 Drawing Sheets

(30) Foreign Application Priority Data

Dec. 31, 2019 (CN) .......................... 201922500766.7
Dec. 31, 2019 (CN) .......................... 201922501602.6

(51) Int. Cl.
*H02K 1/20* (2006.01)
*H02K 3/28* (2006.01)

(56) References Cited

U.S. PATENT DOCUMENTS

| | | | | |
|---|---|---|---|---|
| 9,979,248 | B2 | 5/2018 | Galioto et al. | |
| 2002/0047449 | A1* | 4/2002 | Kim | H02K 3/28 310/184 |
| 2003/0201686 | A1* | 10/2003 | Narita | H02K 16/04 310/211 |
| 2004/0178691 | A1 | 9/2004 | Sanada et al. | |
| 2009/0058213 | A1* | 3/2009 | Sugishima | H02K 23/36 29/598 |
| 2009/0261681 | A1* | 10/2009 | Taguchi | H02K 23/32 310/198 |
| 2010/0001611 | A1* | 1/2010 | Utaka | H02K 1/16 310/216.009 |
| 2010/0117465 | A1 | 5/2010 | Kamiya et al. | |
| 2010/0181862 | A1* | 7/2010 | Krauth | H02K 1/165 310/198 |
| 2010/0213782 | A1* | 8/2010 | Nashiki | H02K 29/03 310/195 |
| 2014/0252909 | A1* | 9/2014 | Sakata | H02K 23/30 242/433 |
| 2014/0300238 | A1* | 10/2014 | Lau | H02K 3/28 310/208 |
| 2015/0061448 | A1* | 3/2015 | Kimura | H02K 5/148 310/177 |
| 2016/0065012 | A1* | 3/2016 | Kawashima | H02K 1/265 310/156.01 |
| 2018/0041078 | A1* | 2/2018 | Kawashima | H02K 11/25 |

FOREIGN PATENT DOCUMENTS

| | | | | |
|---|---|---|---|---|
| CN | 203445707 | U | 2/2014 | |
| CN | 104104170 | A | 10/2014 | |
| CN | 105099031 | A | 11/2015 | |
| CN | 106253530 | A | 12/2016 | |
| CN | 106936233 | A | 7/2017 | |
| CN | 207518366 | U | 6/2018 | |
| CN | 108900014 | A | 11/2018 | |
| CN | 208386260 | U | 1/2019 | |
| CN | 211629943 | U | 10/2020 | |
| CN | 211670690 | U | 10/2020 | |
| CN | 211701635 | U | 10/2020 | |
| EP | 2374198 | A2 | 10/2011 | |
| JP | S 5391302 | A | 8/1978 | |
| JP | H1198786 | A | * 4/1999 | |
| JP | 2000050540 | A | 2/2000 | |
| JP | 2001145313 | A | 5/2001 | |
| JP | 2003032985 | A | 1/2003 | |
| JP | 2012210094 | A | 10/2012 | |
| JP | 2013223255 | A | 10/2013 | |
| JP | 2014011884 | A | 1/2014 | |
| JP | 2015035837 | A | 2/2015 | |
| JP | 2018046721 | A | 3/2018 | |
| JP | 2018148675 | A | 9/2018 | |
| KR | 20190012606 | A | * 2/2019 | ............. H02K 1/165 |
| WO | WO 2010066609 | A2 | 6/2010 | |

OTHER PUBLICATIONS

KR 20190012606 A Machine Translation (Year: 2019).*
Midea Group Co., Ltd., Extended European Search Report and Supplementary Search Report, EP20910868.7, Oct. 14, 2022, 9 pgs.
Midea Group Co., Ltd., Japanese Office Action, JP Patent Application No. 2021-568366, Nov. 29, 2022, 12 pgs.
Midea Group Co., Ltd., Japanese Decision to Grant, JP Patent Application No. 2022-509668, Jul. 4, 2023, 5 pgs.
Midea Group Co., Ltd., WO, PCT/CN2020/137744, Mar. 5, 2021, 4 pgs.
Midea Group Co., Ltd., IPRP, PCT/CN2020/137744, Jul. 5, 2022, 5 pgs.
International Search Report, International application No. PCT/CN2020/137744, mailed Mar. 5, 2021, 11 pgs.
Midea Group Co., Ltd., European Office Action, EP Patent Application No. 20910868.7, Nov. 4, 2024, 4 pgs.
Midea Group Co., Ltd., Chinese Office Action, CN Patent Application No. 201911422872.6, Dec. 30, 2024, 17 pgs.

* cited by examiner

STATOR AND MOTOR

CROSS REFERENCE TO RELATED APPLICATIONS

This application is a continuation application of International (PCT) Patent Application No. PCT/CN2020/137744, filed on Dec. 18, 2020, which claims priority to and the benefit of four Chinese Patent Applications Nos. CN201911422872.6, CN201922500766.7, CN201922499845.0 and CN201922501602.6, all filed on Dec. 31, 2019, the contents of which are incorporated herein by reference in their entireties.

TECHNICAL FIELD

This application relates to the field of motor technology, in particular to a stator and a motor.

BACKGROUND

Low-power high-speed motor in the fields of automobiles, home appliances, medical equipment, and robots is becoming more and more extensive, and the requirements for power density are getting higher and higher. Thus, motors preferably have not only a higher output power, but also have a small overall volume. At the same rotating speed, the power increase mainly depends on the torque increase, and a winding structure with a larger winding coefficient is an important factor. On the other hand, the increase of power density is also related to the overall volume of the motor, and reducing a diameter of the stator or shortening an axial length are both relevant factors. In addition, compared with ordinary motors, the high-speed motor has a poor heat dissipation performance due to its high speed, which further limits the power increase of the high-speed motor.

SUMMARY OF THE DISCLOSURE

This application mainly provides a stator and a motor to solve the problem that the output torque and the output power of the motor are not high.

In order to solve the above technical problems, a technical solution adopted in the present application is to provide a stator. The stator includes a stator core including a plurality of inner stator teeth and a ring-shaped stator yoke, wherein the plurality of inner stator teeth are arranged on an inner side of the stator yoke at intervals along a circumferential direction of the stator yoke, and extend to a central axis of the stator yoke, to form stator slots between adjacent inner stator teeth; and a first phase winding, a second phase winding and a third phase winding, each penetrating through two stator slots which are separated by one stator slot in therebetween, and wound around two adjacent inner stator teeth; wherein each of the stator slots is divided into an inner space and an outer space along a radial direction of the stator yoke, each of the first phase winding, the second phase winding and the third phase winding penetrates through inner spaces of the corresponding two stator slots, or penetrates through outer spaces of the corresponding two stator slots.

In some embodiments, one of the inner space and the outer space of each of the stator slots is penetrated by the first phase winding, the second phase winding, or the third phase winding, and another thereof is in an idle state without being penetrated by anyone of the first phase winding, the second phase winding, and the third phase winding.

In some embodiments, the first phase winding includes a first phase inner winding and a first phase outer winding, the second phase winding includes a second phase inner winding and a second phase outer winding, the third phase winding includes a third phase inner winding and a third phase outer winding, wherein each of the first phase inner winding, the second phase inner winding and the third phase inner winding penetrates through inner spaces of the corresponding two stator slots, and each of the first phase outer winding, the second phase outer winding and the third phase outer winding penetrates through outer spaces of the corresponding two stator slots.

In some embodiments, the first phase inner winding, the second phase inner winding and the third phase inner winding are sequentially staggered with two inner stator teeth along the circumferential direction of the stator yoke; the first phase outer winding, the second phase outer winding and the third phase outer winding are sequentially staggered with two inner stator teeth along the circumferential direction of the stator yoke.

In some embodiments, each of the inner spaces is divided into a first inner sub-space and a second inner sub-space along the circumferential direction of the stator yoke, and each of the first phase inner winding, the second phase inner winding and the third phase inner winding penetrates through a first inner sub-space and a second inner sub-space of the corresponding two stator slots which are adjacent to the wound two inner stator teeth; and each of the outer spaces is divided into a first outer sub-space and a second outer sub-space along the circumferential direction of the stator yoke, each of the first phase outer winding, the second phase outer winding and the third phase outer winding penetrates through a first outer sub-space and a second outer sub-space of the corresponding two stator slots which are adjacent to the wound two inner stator teeth.

In some embodiments, the stator yoke includes a plurality of sub-stator yokes spliced together in sequence, each of the sub-stator yokes is provided with at least two inner stator teeth, two inner stator teeth wound by each of the first phase outer winding, the second phase outer winding and the third phase outer winding are located on the same sub-stator yoke, two inner stator teeth wound by each of the first phase inner winding, the second phase inner winding and the third phase inner winding are located on two adjacent sub-stator yokes.

In some embodiments, a gap is defined between the first phase inner winding and the second phase outer winding and/or between the first phase inner winding and the third phase outer winding along the radial direction of the stator yoke, a gap is defined between the second phase inner winding and the first phase outer winding and/or between the second phase inner winding and the third phase outer winding along the radial direction of the stator yoke, and a gap is defined between the third phase inner winding and the first phase outer winding and/or between the third phase inner winding and the second phase outer winding along the radial direction of the stator yoke.

In some embodiments, two of the first phase winding, the second phase winding, and the third phase winding penetrate through the same inner space or the same outer space, and a gap is defined between two windings along the circumferential direction of the stator yoke.

In some embodiments, each of the first phase winding, the second phase winding, and the third phase winding has an exposed portion exposed from outer spaces of the corresponding two stator slots, which includes two radial portions and a circumferential portion, wherein each of the radial portions extends toward the stator yoke along the radial direction of the stator yoke, the circumferential portion extends along the circumferential direction of the stator yoke and is connected to the two radial portions.

In some embodiments, the stator core further includes a plurality of outer stator teeth, and the plurality of outer stator teeth are arranged on an outer side of the stator yoke at intervals.

In some embodiments, each of the first phase winding, the second phase winding, and the third phase winding penetrating through the outer spaces is routed on the stator yoke to expose at least a part of the outer spaces which is correspondingly straddled thereby, and the at least a part of the outer spaces is configured as a heat dissipation channel.

In some embodiments, each of the first phase winding, the second phase winding, and the third phase winding penetrating through the outer spaces is routed in a range defined from the inner side of the stator yoke to the outer side of the outer stator teeth away from the central axis of the stator yoke to expose at least a part of the outer spaces which is correspondingly straddled thereby, and the at least a part of the outer spaces is configured as a heat dissipation channel.

In some embodiments, the stator core further includes pole shoes, and the pole shoes are connected to free ends of the inner stator teeth away from the stator yoke.

In some embodiments, each of the pole shoes and a corresponding one of the inner stator teeth are an integral structure, or each of the pole shoes is detachably connected to a corresponding one of the inner stator teeth.

In some embodiments, an end of each of the inner stator teeth away from the stator yoke is provided with an insertion slot, an end of each of the pole shoes facing a corresponding one of the inner stator teeth is provided with an insertion tooth, and the insertion tooth and the insertion slot are fastened together.

In some embodiments, the number of the inner stator teeth and the number of the stator slots are six, the number of the first phase winding, the number of the second phase winding and the number of the third phase winding are two, and the two first phase windings, the two second phase windings and the two third phase windings are 180 degrees rotationally symmetric with a rotation center defined by the center axis of the stator yoke, and current directions are opposite to each other.

In order to solve the above technical problems, another technical solution adopted in the application is to provide a motor. The motor includes a rotor and a stator as described above, and the rotor is arranged in the stator.

The beneficial effect of the present application is: different from the prior art, the present application discloses a stator and a motor. The stator provided in this application adopts a winding method with a span of 2 slots, compared with a winding method with a span of 1 slot, the stator with a span of 2 slots can greatly increase the winding coefficient, thereby improving the output torque and the output power of the motor including the stator, and each of the first phase winding, the second phase winding, and the third phase winding penetrates through inner spaces of the corresponding two stator slots, or penetrates through outer spaces of the corresponding two stator slots, so that the windings do not overlap each other, thereby reducing an axial length of the stator along the central axis of the stator yoke, the volume of the stator can be reduced and the power density can be increased, and further the output torque and the output power of the motor including the stator are improved.

BRIEF DESCRIPTION OF THE DRAWINGS

In order to make the technical solution described in the embodiments of the present disclosure clearer, the drawings used for the description of the embodiments will be briefly described. Apparently, the drawings described below are only for illustration but not for limitation. It should be understood that, one skilled in the art might acquire other drawings based on these drawings, without paying any creative efforts.

DETAILED DESCRIPTION

The technical solutions in the embodiments of the present application will be clearly and completely described below in conjunction with the drawings in the embodiments of the present application. Obviously, the described embodiments are only a part of the embodiments of the present application, rather than all the embodiments. Based on the embodiments in this application, all other embodiments obtained by those of ordinary skill in the art without creative work shall fall within the protection scope of this application.

The terms "first", "second", and "third" in the embodiments of the present application are only used for descriptive purposes, and cannot be understood as indicating or implying relative importance or implicitly indicating the number of indicated technical features. Thus, the features defined with "first", "second", and "third" may explicitly or implicitly include at least one of the features. In the description of the present application, "a plurality of" means at least two, such as two, three, etc., unless specifically defined otherwise. In addition, the terms "including" and "having" and any variations thereof are intended to cover non-exclusive inclusions. For example, a process, method, system, product, or device that includes a series of steps or units is not limited to the listed steps or units, but optionally includes unlisted steps or units, or optionally also includes other steps or units inherent to these processes, methods, products or equipment.

Mentioning "embodiments" herein means that a specific feature, structure, or characteristic described in conjunction with the embodiments may be included in at least one embodiment of the present application. The appearance of the phrase in various places in the specification does not necessarily Referring to the same embodiment, nor is it an independent or alternative embodiment mutually exclusive with other embodiments. Those skilled in the art clearly and implicitly understand that the embodiments described herein can be combined with other embodiments.

Figure 1:
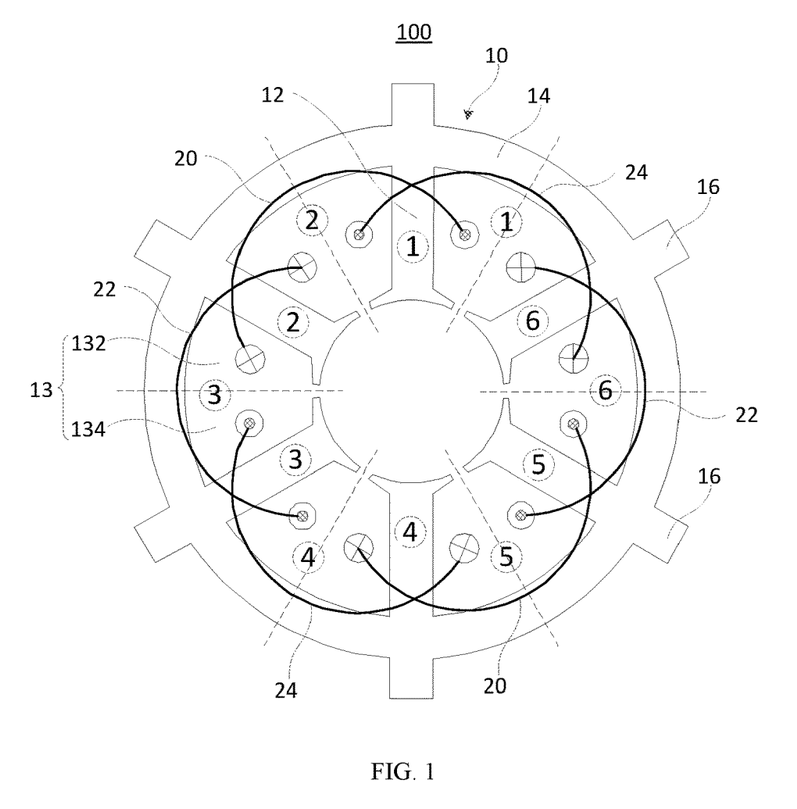
FIG. 1 is a structural schematic diagram of some first embodiments of a stator provided by the present application.

The present application provides a stator 100. Referring to FIG. 1, FIG. 1 is a structural schematic diagram of some embodiments of a stator provided by the present application.

The stator 100 roughly includes a stator core 10, a first phase winding 20, a second phase winding 22, and a third phase winding 24.

Next, a structure of the stator core 10 is first introduced, and then a winding method of the first phase winding 20, the second phase winding 22, and the third phase winding 24 around the stator core 10 is explained.

Figure 2:
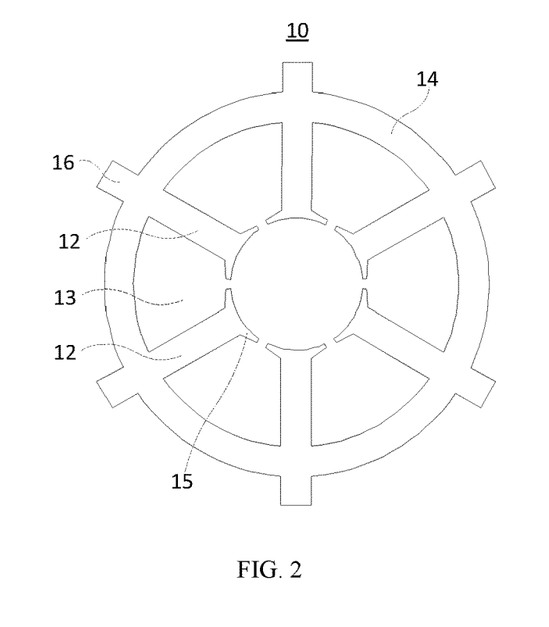
FIG. 2 is a structural schematic diagram of some first embodiments of a stator core of the stator in FIG. 1.

Referring to FIG. 2, the stator core 10 includes a plurality of inner stator teeth 12 and a ring-shaped stator yoke 14. The plurality of inner stator teeth 12 are arranged on an inner side of the stator yoke 14 at intervals along a circumferential direction of the stator yoke 14 and extends to a central axis of the stator yoke 14, and a stator slot 13 is formed between adjacent inner stator teeth 12.

For example, the stator core 10 includes six inner stator teeth 12. The six inner stator teeth 12 are evenly distributed on the inner side of the stator yoke 14. Six stator slots 13 are formed between the six inner stator teeth 12.

In some embodiments, as shown in FIG. 1 to FIG. 4, the stator yoke 14 is an integral structure, and the stator yoke 14 may be in a circular ring shape or a regular polygonal ring shape.

Figure 5:
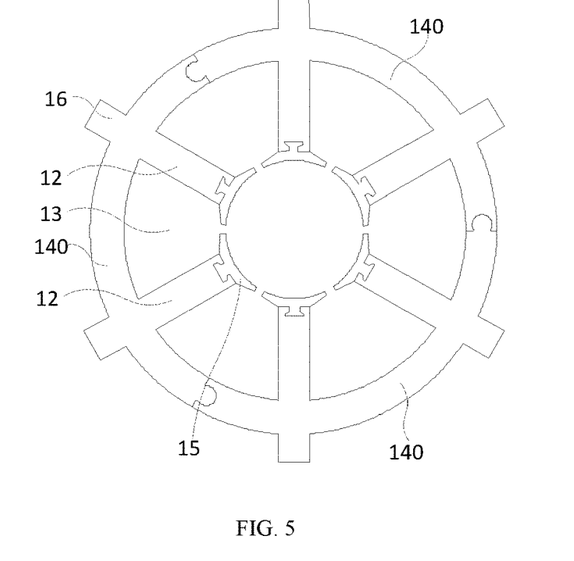
FIG. 5 is a structural schematic diagram of some fourth embodiments of the stator core of the stator in FIG. 1.

In other embodiments, as shown in FIG. 5, the stator yoke 14 includes a plurality of sub-stator yokes 140 spliced together in sequence. Each of the sub-stator yokes 140 is provided with at least one inner stator tooth 12. The plurality of sub-stator yokes 140 are spliced together in sequence and enclosed to define a ring shape to form the stator core 10.

For example, the stator yoke 14 includes three sub-stator yokes 140. Each of the sub-stator yoke 140 is provided with two inner stator teeth 12. The three sub-stator yokes 140 are spliced together and enclosed to form the stator core 10.

When multiple sub-stator yokes 140 are not combined into the stator core 10, the sub-stator yokes 140 are independent with each other and can be manufactured. Therefore, smaller-sized materials can also be used to manufacture the sub-stator yoke 140, which improves the material utilization rate for manufacturing the stator cores 10 and reduces the producing cost of the stator core 10.

Figure 6:
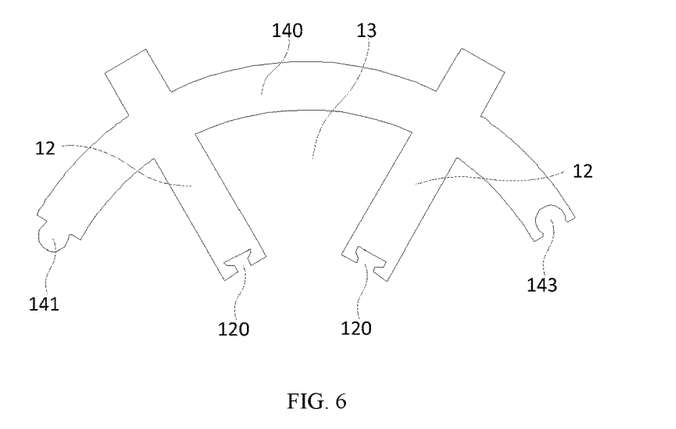
FIG. 6 is a structural schematic diagram of a sub-stator yoke and inner stator teeth of the stator core in FIG. 5.

Specifically, as shown in FIG. 6, one end of each of the sub-stator yokes 140 along the circumferential direction has a protrusion 141, and another end of each of the sub-stator yokes 140 along the circumferential direction has a groove 143. Adjacent sub-stator yokes 140 are engaged and connected by the protrusion 141 and the groove 143.

For example, the protrusion 141 is a half cylinder, the groove 143 is a semi-circular groove, and the half cylinder is engaged with the semi-circular groove to connect two adjacent yokes 120. The protrusion 141 may also be triangular, and the groove 143 is correspondingly a triangular groove.

It is only necessary that shapes of the protrusion 141 and the groove 143 may be engaged and connected with each other, and the shapes of the protrusion 141 and the groove 143 is not limited in the present application.

Figure 3:
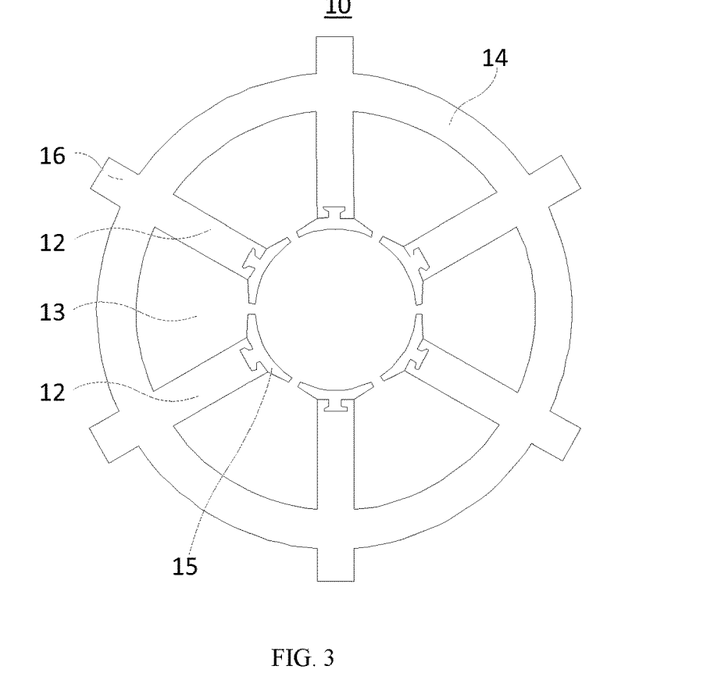
FIG. 3 is a structural schematic diagram of some second embodiments of the stator core of the stator in FIG. 1.

In some embodiments, as shown in FIG. 2 and FIG. 3, each of the stator cores 10 further includes pole shoes 15, and the pole shoes 15 are connected to free ends of the inner stator teeth 12 away from the stator yoke 14.

A side of the pole shoe 15 facing the central axis of the stator yoke 14 is a circular arc surface, which is used to cooperate with a rotor. When the rotor is located in a space defined by the plurality of the pole shoes 15, there is a gap defined between the circular arc surface and the rotor to facilitate the rotor rotating relative to the stator 100.

A gap is defined between adjacent pole shoes 15, and an arc length of the pole shoe 15 along the circumferential direction is greater than a width of the inner stator tooth 12 along the circumferential direction, so that a larger and more uniform magnetic field is generated between the pole shoes 15 and the rotor to be beneficial to increase a power density of the stator 100.

Optionally, as shown in FIG. 2, the pole shoe 15 and the inner stator tooth 12 are an integral structure, and the pole shoe 15 and the inner stator tooth 12 can be punched and formed at one time, or the pole shoe 15 can be welded to the inner stator tooth 12, that is, the pole shoe 15 and the inner stator tooth 12 are non-removable.

Or, as shown in FIG. 3 and FIG. 5, each of the pole shoes 15 is detachably connected to a corresponding one of the inner stator teeth 12.

Figure 7:
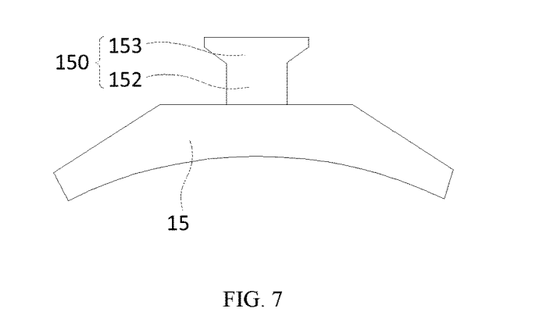
FIG. 7 is a structural schematic diagram of a pole shoe of the stator core in FIG. 3 or FIG. 5.

Referring to FIG. 6 and FIG. 7, an end of each of the inner stator teeth 12 away from the stator yokes 14 is provided with an insertion slot 120, an end of each of the pole shoes 15 facing the inner stator teeth 12 is provided with an insertion tooth 150, and the insertion tooth 150 and the insertion slot 120 are fastened together.

Specifically, the insertion tooth 150 includes a transition section 152 and a clamping section 153, and the transition section 152 is connected between the clamping section 153 and the pole shoe 15. An angle between two adjacent side surfaces connected with each other of the transition section 152 and the pole shoe 15 is greater than or equal to 90 degrees, an angle between two adjacent side surfaces connected with each other of the transition section 152 and the clamping section 153 is greater than or equal to 90 degrees, so as to avoid forming acute angles of connecting portions between the transition section 152 and the pole shoe 15 and between the transition section 152 and the clamping section 153. The acute angle is usually easy to form a stress concentration area, and the accuracy of cutting acute angle is not high for the punching process. Therefore, the manufacturing difficulty of the inner stator teeth 12, the pole shoes 15 and the inserting teeth 150 can be relatively reduced, and the yield of the inner stator teeth 12, the pole shoes 15 and the inserting teeth 150 can be improved.

For example, the transition section 152 is a rectangular body, the clamping section 153 is a trapezoid-like body, and the trapezoid-like body is formed by truncating two acute corners of a trapezoid body. A contour shape of the insertion slot 120 matches a contour shape of the inserting tooth 150, so that angles between adjacent side surfaces of the insertion slot 120 are greater than or equal to 90 degrees, thereby avoiding a stress concentration area generating at the insertion slot 120 and reducing the manufacturing difficulty of the insertion slot 120.

Figure 4:
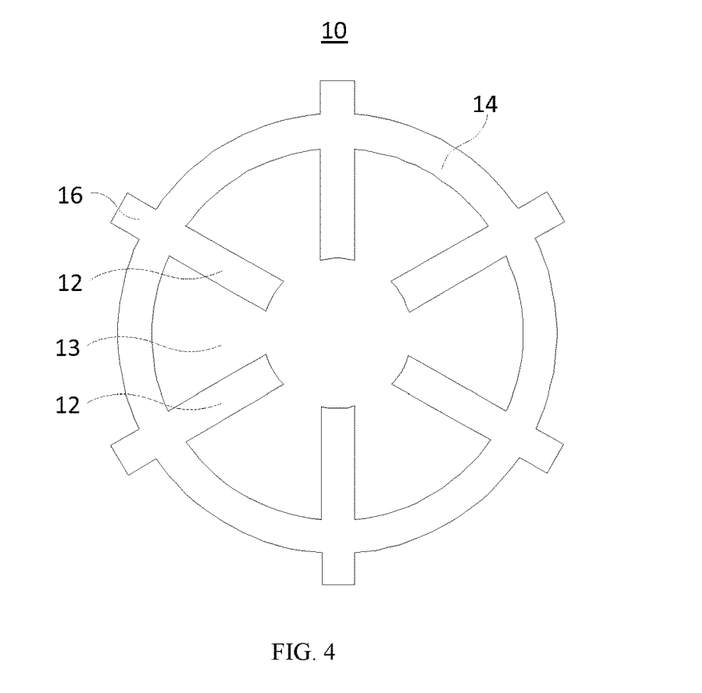
FIG. 4 is a structural schematic diagram of some third embodiments of the stator core of the stator in FIG. 1.

In some embodiments, as shown in FIG. 4, the inner stator tooth 12 is a straight teeth, that is, no pole shoe 15 is provided at the free end of the inner stator tooth 12 away from the stator yoke 14, thereby simplifying the manufacturing process of the stator core 10 and reducing the cost, and at the same time, reducing a winding difficulty for the stator core 10.

In some embodiments, as shown in FIG. 2 to FIG. 5, the stator core 10 may further include a plurality of outer stator teeth 16. The plurality of outer stator teeth 16 are arranged on an outer side of the stator yoke 14 at intervals along the circumferential direction of the stator yoke 14 and extend along a direction away from the central axis of the stator yoke 14, and further a heat dissipation channel is formed between adjacent outer stator teeth 16.

That is, an outer side surface of the stator yoke 14, the outer stator teeth 16 and a supporting surface of an external part for the outer stator teeth 16 are jointly enclosed to form a heat dissipation channel. Cool air can take away heat of the stator 100 through the heat dissipation channel to cool the stator 100, so as to avoid a performance of the stator 100 reducing from being overheated, and to be beneficial to the power increase of the motor.

Positions of the outer stator teeth 16 can correspond to positions of the inner stator teeth 12 in one-to-one correspondence, and are at least partially aligned along the circumferential direction of the stator yoke 14. For example, a width of the outer stator tooth 16 along the circumferential direction of the stator yoke 14 is greater than a width of the inner stator tooth 12 along the circumferential direction of the stator yoke 14, the width of the outer stator tooth 16 along the circumferential direction of the stator yoke 14 is equal to the width of the inner stator teeth 12 along the circumferential direction of the stator yoke 14, or the width of the outer stator tooth 16 along the circumferential direction of the stator yoke 14 is less than the width of the inner stator teeth 12 along the circumferential direction of the stator yoke 14.

Optionally, the number of the outer stator teeth 16 may be more or less than the number of the inner stator teeth 12. The outer stator teeth 16 are evenly distributed on an outside of the stator yoke 14, and the positions of the outer stator teeth 16 do not need to correspond to the positions of the inner stator teeth 12.

Next, the winding method of the first phase winding 20, the second phase winding 22, and the third phase winding 24 around the stator core 10 will be explained.

First Embodiments

As a whole, as shown in FIG. 1, each of the first phase winding 20, the second phase winding 22, and the third phase winding 24 penetrates through two stator slots 13 separated by one stator slot 13 in therebetween and are wound around two adjacent inner stator teeth 12. The first phase winding 20, the second phase winding 22 and the third phase winding 24 are sequentially staggered with one inner stator tooth 12 along the circumferential direction of the stator yoke 14.

For example, the number of the inner stator teeth 12 and the number of the stator slots 13 are six, and the six inner stator teeth 12 and the six stator slots 13 are numbered in sequence, and the six inner stator teeth 12 are named 1 tooth, 2 tooth, . . . , and 6 tooth, and the six stator slots 13 are named 1 slot, 2 slot, . . . , and 6 slot.

For example, one first phase winding 20 penetrates through the 1 slot and the 3 slot separated by the 2 slot, and is wound around the 1 tooth and the 2 tooth. One second phase winding 22 penetrates through the 2 slot and the 4 slot separated by the 3 slot, and is wound around the 2 tooth and the 3 tooth. One third phase winding 24 penetrates through the 3 slot and the 5 slot separated by the 4 slot, and is wound around the 3 tooth and the 4 tooth. Another first phase winding 20 penetrates through the 4 slot and the 6 slot separated by the 5 slot, and is wound around the 4 tooth and the 5 tooth. Another second phase winding 22 penetrates through the 5 slot and the 1 slot separated by the 6 slot, and is wound around the 5 tooth and the 6 tooth. Another third phase winding 24 penetrates through the 6 slot and the 2 slot separated by the 1 slot, and is wound around the 6 tooth and the 1 tooth.

In-phase windings are connected in parallel or in series to form a one-phase winding, and the first phase winding 20, the second phase winding 22 and the third phase winding 24 are connected in parallel or in series to form a three-phase winding.

Some embodiments of the present application adopt a winding method with a span of 2 slots, compared with a winding method with a span of 1 slot, the winding coefficient can be greatly improved, thereby increasing the output torque and the output power of the motor including the stator 100; and the first phase winding 20, the second phase winding 22 and the third phase winding 24 are limited to are sequentially staggered with one inner stator tooth 12 along the circumferential direction of the stator yoke 14, so that each phase winding is sequentially filled with the stator slots 13, which is beneficial improve the power density and the performance of the stator 100.

For example, the winding coefficient of a 6-slot 2-pole motor adopting a tooth-wound winding method with a span of 1 slot is 0.5, while the winding coefficient of a 6-slot 2-pole motor adopting a tooth-wound winding method with a span of 2 slots is increased to 0.866, thereby greatly improving the winding coefficient. Under the same speed, the output torque and the output power of the motor with a span of 2 slots are relatively great.

The stator slot 13 is further divided into a first side space 132 and a second side space 134 along the circumferential direction of the stator yoke 14. The first side space 132 and the second side space 134 of the same stator slot 13 are penetrated by two of the first phase winding 20, the second phase winding 22 and the third phase winding 24.

As shown in FIG. 1, the first side space 132 of the 2 slot is penetrated by the third phase winding 24. The second side space 134 of the 2 slot is penetrated by the second phase winding 22. The first phase winding 20 straddles the 2 slot and penetrates through the second side space 134 of the 1 slot and the first side space 132 of the 3 slot, and is wound around the 1 tooth and the 2 tooth defining the 2 slot. Winding conditions of the remaining slots are similar to this, so we won't repeat them one by one.

Further, cross-sectional areas of the first side space 132 and the second side space 134 perpendicular to the central axis of the stator yoke 14 are the same, and the first side space 132 and the second side space 134 are filled with corresponding windings, so that each winding generates a uniform electric field at the stator core 10, it is beneficial to improve the power density and the performance of the stator 100.

The current directions of any two of the first phase winding 20, the second phase winding 22 and the third phase winding 24 in the same stator slot 13 are opposite to each other.

As shown in FIG. 1, along the direction perpendicular to the central axis of the stator yoke 14, the current direction of the third phase winding 24 in the first side space 132 of the 2 slot is inflow, and the current direction of the second phase winding 22 in the second side space 134 of the 2 slot is outflow.

In these embodiments, the number of the inner stator teeth 12 and the number of the stator slots 13 are six. The number of the first phase winding 20, the number of the second phase winding 22 and the number of the third phase winding 24 are two. The two first phase windings 20, the two second phase windings 22 and the two third phase windings 24 are 180 degrees rotationally symmetric with a rotation center defined by the center axis of the stator yoke 14, and the current directions are opposite to each other, thereby ensuring that electrical angle of the mirror-symmetric in-phase windings is 0 degree, and ensuring that a distributed winding coefficient of this winding structure is 1.

As shown in FIG. 1, one first phase winding 20 penetrates through the 1 slot and the 3 slot, and its current flows from the 1 slot to the 3 slot; another first phase winding 20 penetrates through the 4 slot and the 6 slot, and its current flows from the 6 slot to the 4 slot.

Second Embodiments

Figure 8:
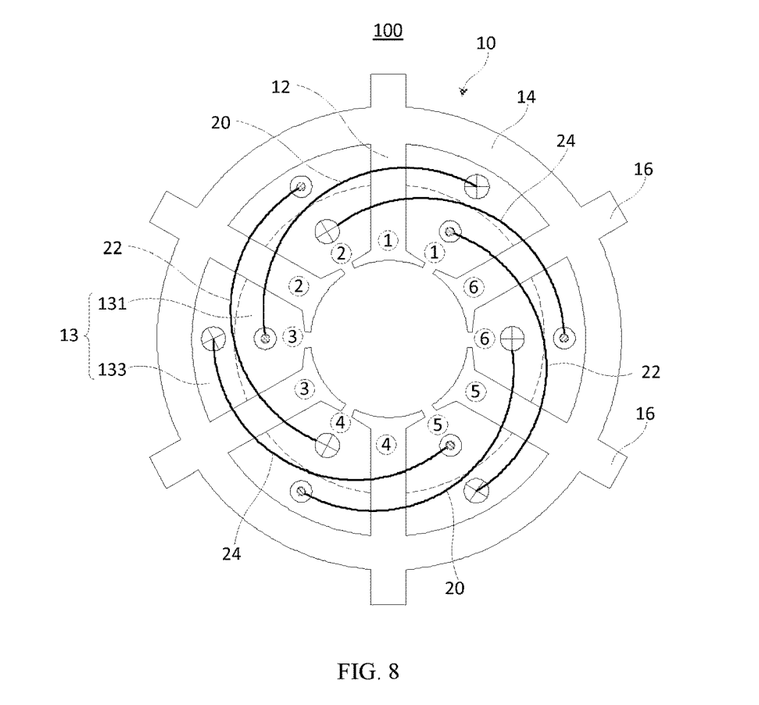
FIG. 8 is a structural schematic diagram of some second embodiments of the stator provided by the present application.

Referring to FIG. 8, each of the first phase winding 20, the second phase winding 22, and the third phase winding 24 penetrates through two stator slots 13 separated by one stator slot 13 in therebetween and are wound around two adjacent inner stator teeth 12.

The stator slot 13 is divided into an inner space 131 and an outer space 133 along a radial direction of the stator yoke 14. Each of the first phase winding 20, the second phase winding 22, and the third phase winding 24 penetrates through from the outer space 133 of one stator slot 13 of the two stator slots 13 to the inner space 131 of another stator slot 13.

As shown in FIG. 8, the first phase winding 20 penetrates through from the outer space 133 of the 1 slot to the inner space 131 of the 3 slot, and straddles the 2 slot to be wound around the 1 tooth and the 2 tooth. The second phase winding 22 penetrates through from the outer space 133 of the 2 slot to the inner space 131 of the 4 slot, and straddles the 3 slot to be wound around the 2 tooth and the 3 tooth. The third phase winding 24 penetrates through from the outer space 133 of the 3 slot to the inner space 131 of the 5 slot, and straddles the 4 slot to be wound around the 3 tooth and the 4 tooth.

Via the first phase winding 20, the second phase winding 22, and the third phase winding 24 are wound around two adjacent inner stator teeth 12 with a span of 2 slots, compared with the stator with a span of 1 slot, the stator with a span of 2 slots provided by the present application can increase the winding coefficient. Under the same speed, the output torque and the output power of the motor with a span of 2 slots are greater; and the stator slot 13 is further divided into the inner space 131 and the outer space 133 along the radial direction of the stator yoke 14, each phase winding is wound around from the outer space 133 of one stator slot 13 to the inner space 131 of another stator slot 13, so that a double-layer winding in the radial direction can reduce the overlapping area of the end of each phase winding, thereby reducing an axial length of the stator 100 along the central axis of the stator yoke 14, and the volume of the stator 100 can be reduced and the power density can be increased.

Cross-sectional areas of the inner space 131 and the outer space 133 perpendicular to the central axis of the stator yoke 14 are the same, and the inner space 131 and the outer space 133 are filled with windings, so that each winding generates a uniform electric field at the stator core 10, it is beneficial to improve the power density and the performance of the stator 100.

The first phase winding 20, the second phase winding 22 and the third phase winding 24 are sequentially staggered with one inner stator tooth 12 along the circumferential direction of the stator yoke 14, so that the stator slots 13 are filled with phase windings, it is beneficial to improve the power density and the performance of the stator 100.

The current directions of any two of the first phase winding 20, the second phase winding 22, and the third phase winding 24 in the same stator slot 13 are opposite to each other.

As shown in FIG. 8, along the direction perpendicular to the central axis of the stator yoke 14, the current direction of the third phase winding 24 in the inner space 131 of the 2 slot is inflow, and the current direction of the second phase winding 22 in the outer space 131 of the 2 slot is outflow.

Third Embodiments

Figure 9:
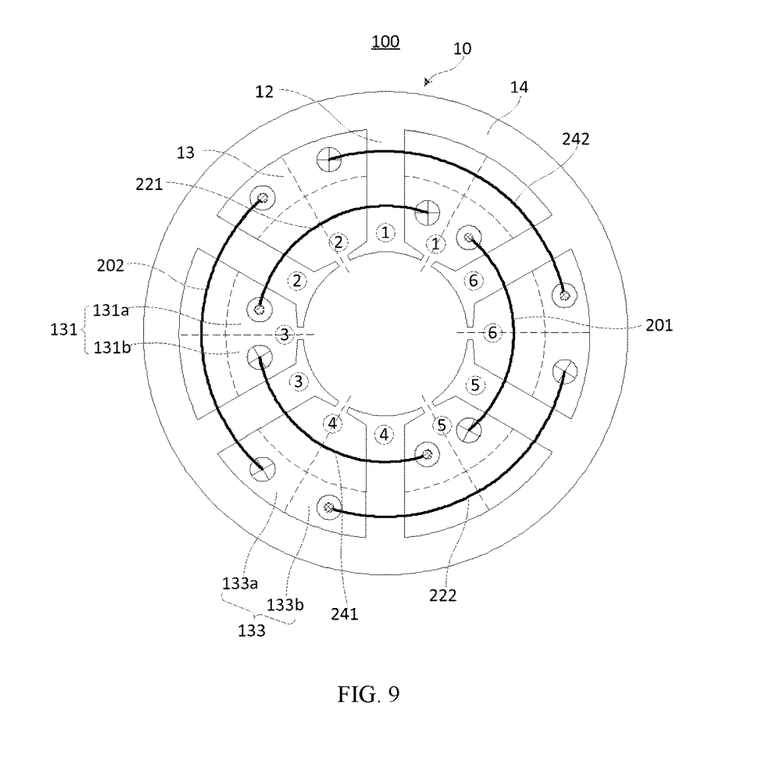
FIG. 9 is a structural schematic diagram of some third embodiments of the stator provided by the present application.

Referring to FIG. 9, each of the first phase winding 20, the second phase winding 22, and the third phase winding 24 penetrates through two stator slots 13 separated by one stator slot 13 in therebetween and are wound around two adjacent inner stator teeth 12.

The stator slot 13 is divided into an inner space 131 and an outer space 133 along the radial direction of the stator yoke 14, and each of the first phase winding 20, the second phase winding 22, and the third phase winding 24 penetrates through inner spaces 131 of the corresponding two stator slots 13, or penetrates through outer space 121 of the corresponding two stator slots 13.

As shown in FIG. 9, one first phase winding 20 (reference number 202) penetrates through the outer spaces 133 of the 2 slot and the 4 slot, and is wound around the 2 tooth and the 3 tooth; another first phase winding 20 (reference number 201) penetrates through the inner spaces 131 of the 5 slot and the 1 slot, and is wound around the 5 tooth and 6 tooth.

Via the first phase winding 20, the second phase winding 22, and the third phase winding 24 wound around two adjacent inner stator teeth 12 with a span of 2 slots, compared with the stator with a span of 1 slot, the stator with a span of 2 slots provided by the present application can increase the winding coefficient. Under the same speed, the output torque and the output power of the motor with a span of 2 slots are greater; and each of the first phase winding 20, the second phase winding 22, and the third phase winding 24 penetrates through inner spaces 131 of the corresponding two stator slots 13, or penetrates through outer spaces 121 of the corresponding two stator slots 13, so that the windings do not overlap each other, thereby reducing an axial length of the stator 100 along the central axis of the stator yoke 14, and the volume of the stator 100 can be reduced and the power density can be increased.

One of the inner space 131 and the outer space 133 of each stator slot 13 is penetrated by the first phase winding 20, the second phase winding 22, or the third phase winding 24. Another is in an idle state without being penetrated by anyone of the first phase winding. 20, the second phase winding 22 and the third phase winding 24. In other words, one of the inner space 131 and the outer space 133 of each stator slot 13 is occupied by one or two of the first phase winding 20, the second phase winding 22, and the third phase winding 24. Vacant inner space 131 or vacant outer space 133 are configured as a heat dissipation channel to facilitate cooling the stator 100.

As shown in FIG. 9, the inner space 131 of the 3 slot is occupied by the second phase winding 22 (reference number 221) and the third phase winding 24 (reference number 241). The outer space 133 of the 3 slot is in an idle state without occupied by any winding. The first phase winding 20 (reference number 202) straddles the outer space 133 of the 3 slot and is wound around the 2 tooth and the 3 tooth.

In other embodiments, both of the inner space 131 and the outer space 133 of each stator slot 13 can be occupied by the first phase winding 20, the second phase winding 22, or the third phase winding 24.

Further, the first phase winding 20 includes a first phase inner winding 201 and a first phase outer winding 202. The second phase winding 22 includes a second phase inner winding 221 and a second phase outer winding 222. The third phase winding 24 includes a third phase inner winding 241 and a third phase outer winding 242. Each of the first phase inner winding 201, the second phase inner winding 221, and the third phase inner winding 241 is penetrated through inner spaces 131 of the corresponding two stator slots 13. Each of the first phase outer winding 202, the second phase outer winding 222, and the third phase outer winding 224 is penetrate through outer spaces 133 of the corresponding two stator slots 13.

The first phase inner winding 201, the second phase inner winding 221 and the third phase inner winding 241 are sequentially staggered with two inner stator teeth 12 along the circumferential direction of the stator yoke 14. The first phase outer winding 202, the second phase outer winding 222 and the third phase outer winding 242 are sequentially staggered with two inner stator teeth 12 along the circumferential direction of the stator yoke 14.

As shown in FIG. 9, the first phase outer winding 202 penetrates through the outer spaces 133 of the 2 slot and the 4 slot. The second phase outer winding 222 penetrates through the out spaces 133 of the 4 slog and the 6 slot. The third phase outer winding 224 penetrates through the outer spaces 133 of the 6 slot and the 2 slot. The first phase inner winding 201 penetrates through the inner spaces 131 of the 5 slot and the 1 slot. The second phase inner winding 221 penetrates through the inner spaces 131 of the 1 slot and the 3 slot, and the third phase inner winding 241 penetrates through the inner spaces 131 of the 3 slot and the 5 slot.

The inner space 131 is further divided into a first inner sub-space 131a and a second inner sub-space 131b along the circumferential direction of the stator yoke 14. Each of the first phase inner winding 201, the second phase inner winding 221 and the third phase inner winding 241 penetrates through a first inner sub-space 131a and a second inner sub-space 131b of the corresponding two stator slots 13 which are adjacent to the wound two inner stator teeth 12.

The outer space 133 is further divided into a first outer sub-space 133a and a second outer sub-space 133b along the circumferential direction of the stator yoke 14. Each of the first phase outer winding 202, the second phase outer winding 222, and the third phase outer space winding 242 penetrates through a first outer sub-space 133a and a second outer sub-space 133b of the corresponding two stator slots 13 which are adjacent to the wound two inner stator teeth 12.

Cross-sectional areas of the inner space 131 and the outer space 133 perpendicular to the central axis of the stator yoke 14 are the same. Cross-sectional areas of the first inner sub-space 131a and the second inner sub-space 131b perpendicular to the central axis of the stator yoke 14 are the same. Cross-sectional areas of the first outer sub-space 133a and the second outer sub-space 133b perpendicular to the central axis of the stator yoke 14 are the same. The first inner sub-space 131a, the second inner sub-space 131b, the first outer sub-space 133a, and the second outer sub-space 133b penetrated by corresponding windings are full of windings, so that each winding generates a uniform electric field at the stator core 10, it is beneficial to improve the power density and the performance of the stator 100.

Figure 10:
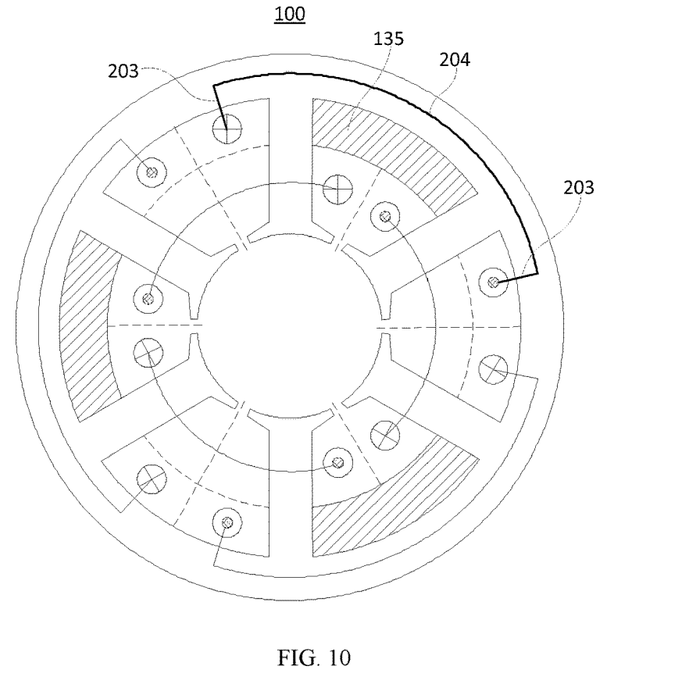
FIG. 10 is a structural schematic diagram of some fourth embodiments of the stator provided by the present application.

Referring to FIG. 9 and FIG. 10 in combination, each of the first phase outer winding 202, the second phase outer winding 222, and the third phase outer winding 242 has an exposed portion exposed from outer spaces of the corresponding two stator slots 13, which includes two radial portions 203 and a circumferential portion 204. Each of the radial portions 203 extends toward the stator yoke 14 along the radial direction of the stator yoke 14. The circumferential portion 204 extends along the circumferential direction of the stator yoke 14, and the circumferential portion 204 is connected to the two radial portions 203. The outer space 133 of the stator slot 13 sandwiched between the two radial portions 203 is idle and is configured as a heat dissipation channel.

In other words, the outer spaces 133 of the stator slots 13 sandwiched between the two radial portions 203 of the first phase outer winding 202, the second phase outer winding 222, and the third phase outer winding 242 are idle and configured as heat dissipation channels 135. Cold air penetrates through the heat dissipation channels 135 to remove heat from the stator 100 to cool the stator 100, so as to avoid the performance of the stator 100 reducing from being overheated, and to be beneficial to the power increase of the motor.

Figure 11:
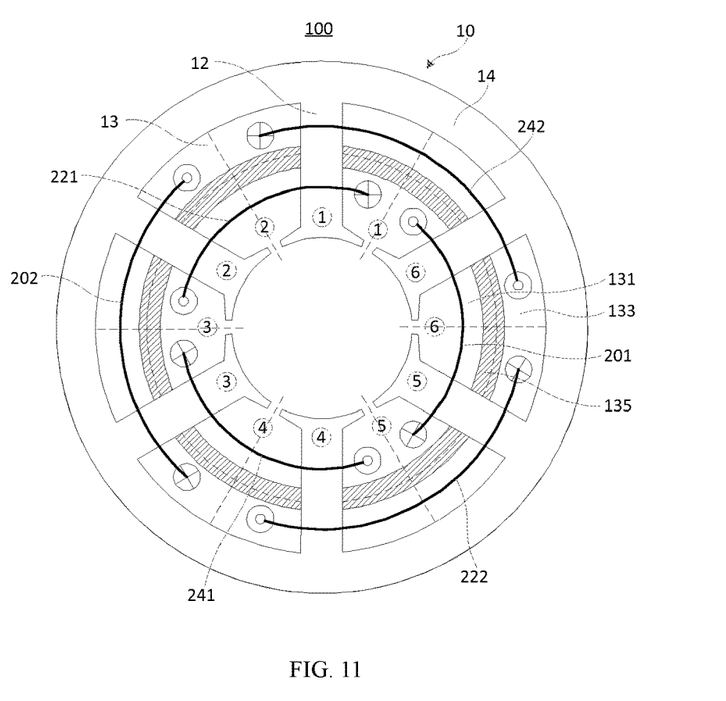
FIG. 11 is a structural schematic diagram of some five embodiments of the stator provided by the present application.

In other embodiments, as shown in FIG. 11, a gap is defined between the first phase inner winding 201 and the second phase outer winding 222 and/or between the first phase inner winding 201 and the third phase outer winding 242 along the radial direction of the stator yoke 14, and the gaps are configured as heat dissipation channels 135.

As shown in FIG. 9, the inner space 131 of the 6 slot is not penetrated by any winding, while the outer space 133 of the 6 slot is penetrated by the second phase outer winding 222 and the third phase outer winding 242, and the first phase inner winding 201 straddles the inner space 131 of the 6 slot. Therefore, the gaps are defined between the first phase inner winding 201 and the second phase outer winding 222 and/or between the first phase inner winding 201 and the third phase outer winding 242 along the radial direction of the stator yoke 14, so that cold air can penetrate through the inner space 131 from the gap to take away heat from the stator 100, thereby cooling the stator 100.

Correspondingly, a gap is defined between the second phase inner winding 221 and the first phase outer winding 202 and/or between the second phase inner winding 221 and the third phase outer winding 242 along the radial direction of the stator yoke 14, and the gap is configured as a heat dissipation channel 135. A gap is defined between the third phase inner winding 241 and the first phase outer winding 202 and/or between the third phase inner winding 241 and the second phase outer winding 222 along the radial direction of the stator yoke 14, and the gap is configured as a heat dissipation channel 135. A gap is defined between the first phase outer winding 202 and the second phase inner winding 221 and/or between the first phase outer winding 202 and the third phase inner winding 241 along the radial direction of the stator yoke 14, and the gap is configured as a heat dissipation channel 135. A gap is defined between the second phase outer winding 222 and the first phase inner winding 201 and/or the second phase outer winding 222 and the third phase inner winding 241 along the radial direction of the stator yoke 14, and the gap is configured as a heat dissipation channel 135. A gap is defined between the third phase outer winding 242 and the first phase inner winding 201 and/or between the third phase outer winding 242 and the second phase inner winding 221 along the radial direction of the stator yoke 14, and the gap is configured as a heat dissipation channel 135.

Figure 12:
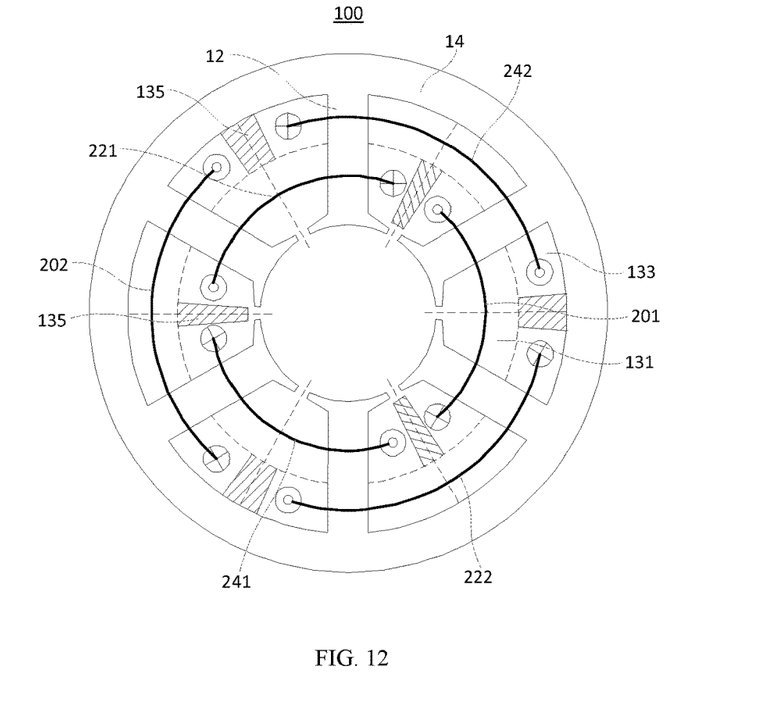
FIG. 12 is a structural schematic diagram of some sixth embodiments of the stator provided by the present application.

Or, two of the first phase winding 20, the second phase winding 22, and the third phase winding 24 penetrate through the same inner space 131 or the same outer space 133, there is a gap between the two windings along the circumferential direction of the stator yoke 14, and the gap is configured as a heat dissipation channel 135.

Specifically, as shown in FIG. 12, a gap is defined between the first phase inner winding 201 and the second phase inner winding 221 penetrating through the same inner space 131 along the circumferential direction of the stator yoke 14, a gap is defined between the second phase inner winding 221 and the third phase inner winding 241 penetrating through the same inner space 131 along the circumferential direction of the stator yoke 14, a gap is defined between the third phase inner winding 241 and the first phase inner winding 201 penetrating through the same inner space 131 along the circumferential direction of the stator yoke 14, a gap is defined between the first phase outer winding 202 and the second phase outer winding 222 penetrating through the same outer space 133 along the circumferential direction of the stator yoke 14, a gap is defined between the second phase outer winding 222 and the third phase outer winding 242 penetrating through the same outer space 133 along the circumferential direction of the stator yoke 14, a gap is defined between the third phase outer winding 242 and the first phase outer layer winding 202 penetrating through the same outer space 133 along the circumferential direction of the stator yoke 14, and the gaps are configured as heat dissipation channels 135.

Figure 13:
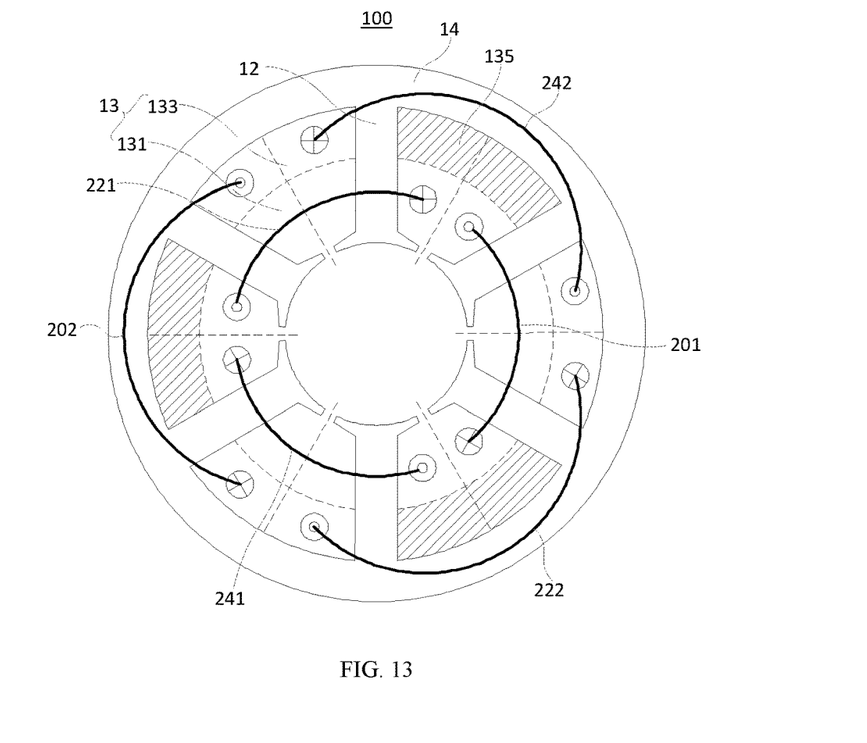
FIG. 13 is a structural schematic diagram of some seventh embodiments of the stator provided by the present application.

In some other embodiments, each of the first phase winding 20, the second phase winding 22, and the third phase winding 24 penetrating through the outer spaces 133 is routed on the stator yoke 14 to expose at least a part of the outer spaces which is correspondingly straddled thereby. The at least a part of the outer spaces 133 is configured as a heat dissipation channel 135.

Specifically, as shown in FIG. 13, each of the first phase outer winding 202, the second phase outer winding 222, and the third phase outer winding 242 is routed on a corresponding part of the stator yoke 14 to avoid the correspondingly straddled outer space 133, thereby further exposing at least a part of the straddled outer space 133. The straddled outer space 133 is in an idle state, and the straddled outer space 133 is configured as a heat dissipation channel 135.

Figure 14:
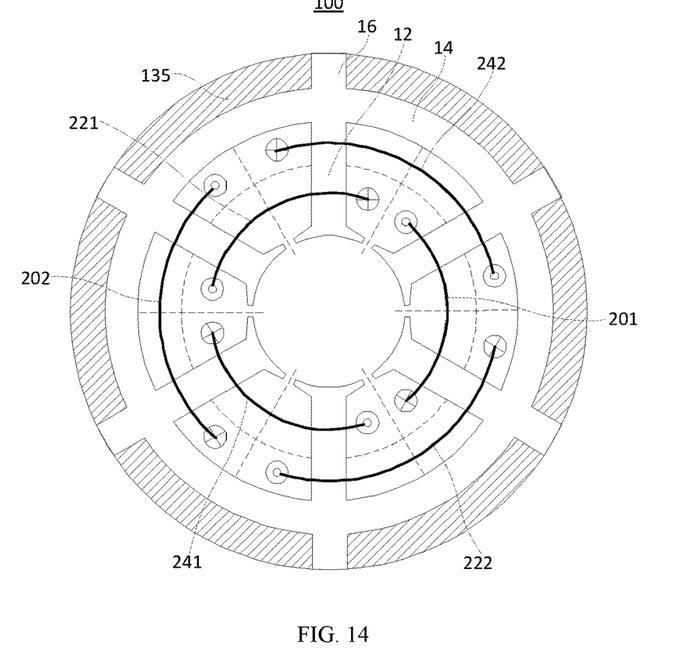
FIG. 14 is a structural schematic diagram of some eighth embodiments of the stator provided by the present application.

In other embodiments, as shown in FIG. 14, the stator core 10 further includes a plurality of outer stator teeth 16, the plurality of outer stator teeth 16 are arranged on the outer side of the stator yoke 14 at intervals along the circumferential direction of the stator yoke 14, and extends away from the central axis of the stator yoke 14, so a heat dissipation channel 135 is defined between adjacent outer stator teeth 16.

Further, each of the first phase winding 20, the second phase winding 22, and the third phase winding 24 penetrating through the outer space 133 is routed in a range defined from the inner side of the stator yoke 14 to the outer side of the outer stator teeth 16 away from the central axis of the stator yoke 14 to expose corresponding straddled outer space 133. The straddled outer space 133 is in an idle state, and the straddled outer space 133 is configured as a heat dissipation channel 135.

Figure 15:
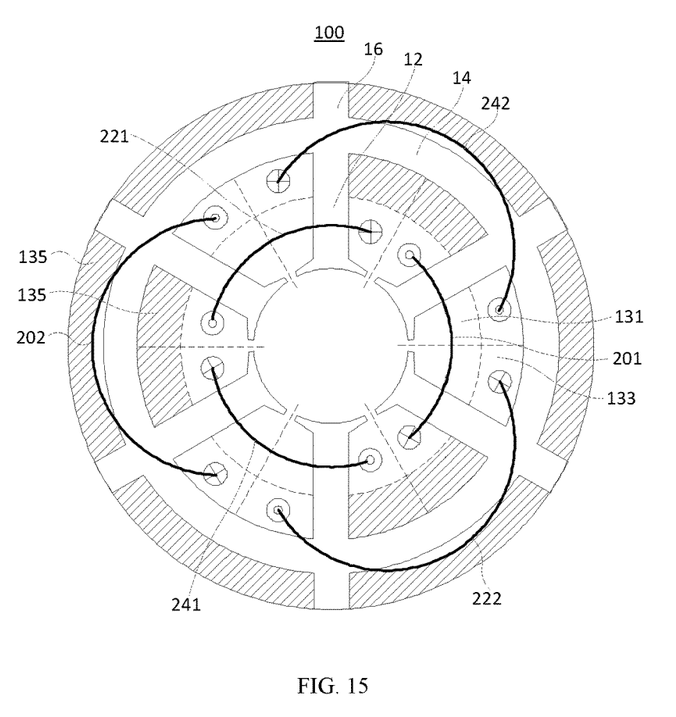
FIG. 15 a structural schematic diagram of some ninth embodiments of the stator provided by the present application.

Specifically, as shown in FIG. 15, each of the first phase outer winding 202, the second phase outer winding 222, and the third phase outer winding 242 can be routed on the stator yoke 14 and the outer stator teeth 16 and in a range defined from the stator yoke 14 or the inner side of the stator 14 to the outer stator teeth 16 away from the central axis of the stator yoke 14 to expose corresponding straddled outer space 133. The straddled outer space 133 is in an idle state, and a space defined between adjacent outer stator teeth 16 is not completely blocked by wires of each phase winding. Therefore, vacant outer space 133 and portions between adjacent outer stator teeth 16 not covered by windings may be configured as heat dissipation channels 135.

In some embodiments, referring to FIG. 5 and FIG. 9 in combination, the stator yoke 14 includes a plurality of sub-stator yokes 140 spliced together in sequence. Each sub-stator yoke 140 is provided with at least two inner stator teeth 12. The two inner stator teeth 12 wound by the first phase outer winding 202, the second phase outer winding 222 and the third phase outer winding 242 are located on the same sub-stator yoke 140. The two inner stator teeth 12 wound by the first phase inner winding 201, the second phase inner winding 221 and the third phase inner winding 241 are located on two adjacent sub-stator yokes 140.

Therefore, on one sub-stator yoke 140, the first phase outer winding 202, the second phase outer winding 222, or the third phase outer winding 242 can be wound first, and then the plurality of sub-stator yokes 140 are spliced with each other to form the stator core 10, after the splicing is completed, each of the first phase inner winding 201, the second phase inner winding 221, and the third phase inner winding 241 is wound, so that the difficulty of winding the first phase outer winding 202, the second phase outer winding 222 and the first phase can be reduced to easily assemble the winding structure of windings on the stator 10, to facilitate mechanized winding, thereby improving the production efficiency of the stator 100.

Figure 16:
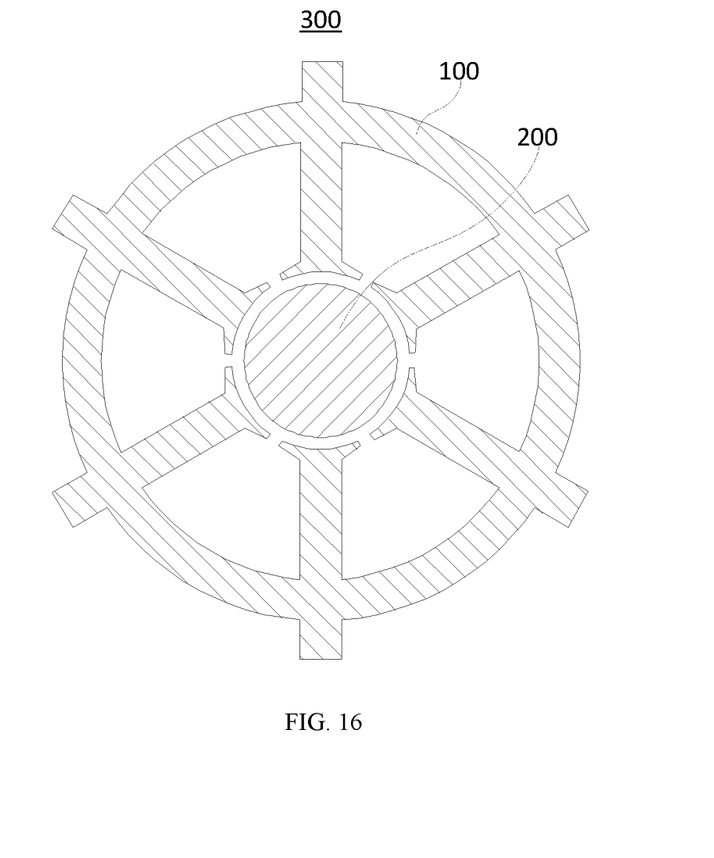
FIG. 16 is a structural schematic diagram of some embodiments of a motor provided by the present application.

Based on this, the present application also provides a motor 300. Referring to FIG. 16, the motor 300 includes a rotor 200 and a stator 100 mentioned as the above, and the rotor 200 is provided in the stator 100.

Different from the prior art, the present application discloses a stator and a motor. The stator provided in this application adopts a winding method with a span of 2 slots, compared with a winding method with a span of 1 slot, the stator with a span of 2 slots can greatly increase the winding coefficient, thereby improving the output torque and the output power of the motor including the stator, and each of the first phase winding, the second phase winding, and the third phase winding penetrates through inner spaces of the corresponding two stator slots, or penetrates through outer spaces of the corresponding two stator slots, so that the windings do not overlap each other, thereby reducing an axial length of the stator along the central axis of the stator yoke, the volume of the stator can be reduced and the power density can be increased, and further the output torque and the output power of the motor including the stator are improved.

The above are only embodiments of the present disclosure and are not intended to limit the scope of the present disclosure. Any equivalent structural changes made under the concept of the present disclosure, using the contents of the specification of the present disclosure and the accompanying drawings, or applied directly/indirectly in other related fields of technology are included in the scope of protection of the present disclosure.

What is claimed is:

1. A stator, comprising:
a stator core comprising a plurality of inner stator teeth and a ring-shaped stator yoke, wherein the plurality of inner stator teeth are arranged on an inner side of the stator yoke at intervals along a circumferential direction of the stator yoke, and extend to a central axis of the stator yoke, to form stator slots between adjacent inner stator teeth;
a first phase winding, a second phase winding and a third phase winding, each penetrating through two stator slots which are separated by one stator slot in therebetween, and wound around two adjacent inner stator teeth;
wherein each of the stator slots is divided into an inner space and an outer space along a radial direction of the stator yoke, each of the first phase winding, the second phase winding and the third phase winding penetrates through inner spaces of corresponding two stator slots, or penetrates through outer spaces of the corresponding two stator slots,
the first phase winding comprises a first phase inner winding and a first phase outer winding, the second phase winding comprises a second phase inner winding and a second phase outer winding, the third phase winding comprises a third phase inner winding and a third phase outer winding, wherein each of the first phase inner winding, the second phase inner winding and the third phase inner winding penetrates through inner spaces of the corresponding two stator slots, and each of the first phase outer winding, the second phase outer winding and the third phase outer winding passes through outer spaces of the corresponding two stator slots; and
a gap is defined between the first phase inner winding and the second phase outer winding and/or between the first phase inner winding and the third phase outer winding along the radial direction of the stator yoke and configured as a heat dissipation channel to form a circumferential heat dissipation channel running through each of the stator slots and occupying a portion of the inner space and the outer space of each slot.

2. The stator according to claim 1, wherein the first phase inner winding, the second phase inner winding and the third phase inner winding are sequentially staggered with two inner stator teeth along the circumferential direction of the stator yoke; the first phase outer winding, the second phase outer winding and the third phase outer winding are sequentially staggered with two inner stator teeth along the circumferential direction of the stator yoke.

3. The stator according to claim 1, wherein each of the inner spaces is divided into a first inner sub-space and a second inner sub-space along the circumferential direction of the stator yoke, and each of the first phase inner winding, the second phase inner winding and the third phase inner winding penetrates through a first inner sub-space and a second inner sub-space of the corresponding two stator slots which are adjacent to the wound two inner stator teeth; and
each of the outer spaces is divided into a first outer sub-space and a second outer sub-space along the circumferential direction of the stator yoke, each of the first phase outer winding, the second phase outer winding and the third phase outer winding penetrates through a first outer sub-space and a second outer sub-space of the corresponding two stator slots which are adjacent to the wound two inner stator teeth.

4. The stator according to claim 1, wherein the stator yoke comprises a plurality of sub-stator yokes spliced together in sequence, each of the sub-stator yokes is provided with at least two inner stator teeth, two inner stator teeth wound by each of the first phase outer winding, the second phase outer winding and the third phase outer winding are located on the same sub-stator yoke, two inner stator teeth wound by each of the first phase inner winding, the second phase inner winding and the third phase inner winding are located on two adjacent sub-stator yokes.

5. The stator according to claim 1, wherein a gap is defined between the first phase inner winding and the second phase outer winding and/or between the first phase inner winding and the third phase outer winding along the radial direction of the stator yoke, a gap is defined between the second phase inner winding and the first phase outer winding and/or between the second phase inner winding and the third phase outer winding along the radial direction of the stator yoke, and a gap is defined between the third phase inner winding and the first phase outer winding and/or between the third phase inner winding and the second phase outer winding along the radial direction of the stator yoke.

6. The stator according to claim 1, wherein two of the first phase winding, the second phase winding, and the third phase winding penetrate through the same inner space or the same outer space, and a gap is defined between two windings along the circumferential direction of the stator yoke.

7. The stator according to claim 1, wherein the stator core further comprises pole shoes, and the pole shoes are connected to free ends of the inner stator teeth away from the stator yoke.

8. The stator according to claim 7, wherein each of the pole shoes and a corresponding one of the inner stator teeth are an integral structure, or each of the pole shoes is detachably connected to a corresponding one of the inner stator teeth.

9. The stator according to claim 8, wherein an end of each of the inner stator teeth away from the stator yoke is provided with an insertion slot, an end of each of the pole shoes facing a corresponding one of the inner stator teeth is provided with an insertion tooth, and the insertion tooth and the insertion slot are fastened together.

10. The stator according to claim 1, wherein a number of the inner stator teeth and a number of the stator slots are six, a number of the first phase winding, a number of the second phase winding and a number of the third phase winding are two, and the two first phase windings, the two second phase windings and the two third phase windings are 180 degrees rotationally symmetric with a rotation center defined by a center axis of the stator yoke, and current directions are opposite to each other.

11. A motor, wherein the motor comprises a rotor and the stator according to claim 1, and the rotor is arranged in the stator.

* * * * *